United States Patent
Salimkhan

(10) Patent No.: US 7,648,182 B2
(45) Date of Patent: Jan. 19, 2010

(54) TERMINAL PORTION OF A ROBOTIC PICK-UP ELEMENT PROVIDED WITH VACUUM SUCTION CUPS

(75) Inventor: Jacques Salimkhan, Nizza (FR)

(73) Assignee: Around the Clock S.A., Panama (PA)

( * ) Notice: Subject to any disclaimer, the term of this patent is extended or adjusted under 35 U.S.C. 154(b) by 0 days.

(21) Appl. No.: 11/792,418

(22) PCT Filed: Dec. 10, 2004

(86) PCT No.: PCT/IB2004/004135

§ 371 (c)(1),
(2), (4) Date: Jun. 6, 2007

(87) PCT Pub. No.: WO2006/061677

PCT Pub. Date: Jun. 15, 2006

(65) Prior Publication Data

US 2008/0101909 A1    May 1, 2008

(51) Int. Cl.
*B25J 15/06* (2006.01)
*B66C 1/02* (2006.01)

(52) U.S. Cl. .............................. 294/65; 294/2; 294/64.1

(58) Field of Classification Search ................. 294/64.1, 294/65, 2

See application file for complete search history.

(56) References Cited

U.S. PATENT DOCUMENTS

| | | | | | |
|---|---|---|---|---|---|
| 3,013,833 | A | * | 12/1961 | Gwin et al. | 356/61 |
| 4,411,574 | A | * | 10/1983 | Riley | 294/65 |
| 5,048,811 | A | * | 9/1991 | Hochbein | 294/64.1 |
| 5,079,903 | A | * | 1/1992 | Hakansson | 53/247 |
| 5,755,550 | A | * | 5/1998 | Brandt et al. | 294/64.1 |
| 2001/0015372 | A1 | | 8/2001 | Yamamoto et al. | |

FOREIGN PATENT DOCUMENTS

DE            100 59 257 C1      2/2002

* cited by examiner

*Primary Examiner*—Paul T Chin
(74) *Attorney, Agent, or Firm*—Young & Thompson

(57) ABSTRACT

A terminal portion for a robotic pick-up element lifts and transfers objects, the terminal portion lifts objects using vacuum suction cups. The terminal portion includes: a) a main unit, on the lower face of which are fixed a support suction cup and a vacuum transfer suction cup connected to the pneumatic equipment; b) a secondary unit, on the lower face of which are mounted a plurality of pick-up suction cups, the suction passages of which are connected to a single collecting passage opening into a hole on the upper face of the secondary unit which is smooth and shaped to adhere to the support cup and the vacuum transfer cup when they are placed next to it and the vacuum transfer cup of the main unit coaxially faces the hole of the secondary unit.

2 Claims, 2 Drawing Sheets

TERMINAL PORTION OF A ROBOTIC PICK-UP ELEMENT PROVIDED WITH VACUUM SUCTION CUPS

CROSS REFERENCE TO RELATED APPLICATIONS

The present Application claims priority to and includes by reference International Application No. PCT/IB2004/004135 filed Dec. 10, 2004.

The present invention relates to the field of robotic systems which move objects according to predetermined programs, by lifting these objects with pick-up elements and transferring them to positions other than the initial positions in which they were picked up.

As is known, according to requirements, the operations described above, which are controlled and directed by an electronic computer, can be carried out along the two coordinate axes defining a horizontal plane or along a set of three orthogonal axes.

More specifically, the invention relates to the terminal portions of the aforementioned pick-up elements. As those skilled in the art will know, these elements terminate in suction cups connected to pneumatic equipment which activates the suction cup by creating a vacuum inside it.

Depending on the type of object to be picked up, in other words depending on the shape, the weight, the roughness of the outer surface, etc., suction cups with different characteristics have to be used, and this makes it necessary to change them, possibly on many occasions, during a single operating cycle. This requires manual intervention by an operator, with considerable loss of time. Above all, the fact that the said operator has to intervene within the operating area of a robotic system also entails a more than negligible risk of accidents.

The inventor of the subject of the present application has provided a solution to the problems described above, by devising a terminal portion of the type described above, but made in such a way that it can be used for a considerable number of objects of different types, because of the possibility of replacing it rapidly and easily with other similar portions carrying suction cups of different types and/or sizes.

The inventor has devised a terminal portion for a robotic pick-up element comprising a main unit provided with two suction cups, the first of which acts as a support cup while the second acts as a vacuum transfer cup. By means of the attractive force exerted by the first suction cup, the main unit is connected to, and supports, a secondary unit which is provided with a plurality of pick-up suction cups of different types, and transfers the vacuum through the second suction cup to the pneumatic circuit terminating within the latter suction cups.

This can be done because the upper side of the secondary unit has a hole which is connected to all the branches of the pneumatic circuit leading to the said pick-up suction cups, this hole lying inside the said vacuum transfer suction cup when the said main and secondary units are interconnected as described.

By using a different secondary unit from time to time, it is therefore possible to pick up and transfer objects of different types without having to change any suction cups.

At the end of any given operating cycle, it is simply necessary to set the secondary unit down on a suitable support, and pick up another secondary unit having a different set of suction cups, thus preparing for the execution of another operating cycle with no significant downtime.

The present invention therefore proposes a terminal portion for a robotic pick-up element as described in the attached claim 1.

A more detailed description will now be given of a preferred example of embodiment of a terminal portion according to the invention, with additional reference to the attached drawings, in which.

Figure 1:
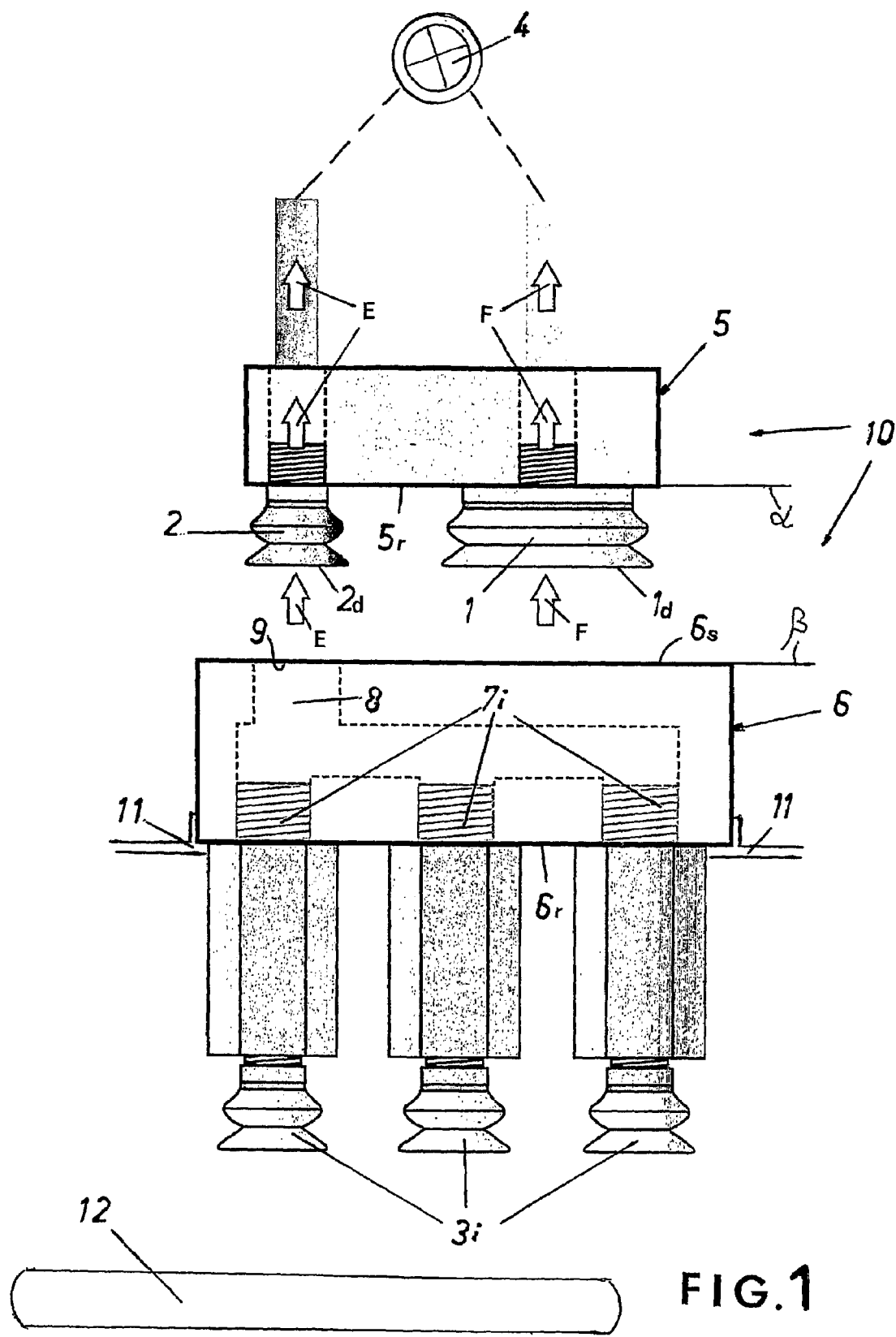
FIG. 1 is a schematic see-through front view of the said example of embodiment, with the main unit separated from the secondary unit.

As shown in the figures, the terminal portion 10 according to the invention essentially comprises a main unit 5, on the lower face 5r of which there are fitted a support suction cup 1 and a vacuum transfer suction cup 2, connected pneumatically to equipment 4 of a known type (only indicated in a general way in the drawings) which can create the desired level of vacuum in the cups.

The said terminal portion 10 also comprises a secondary unit 6, on the lower face 6r are mounted a plurality of pick-up suction cups 3i. The latter suction cups 3i, although shown as substantially identical in the drawings, can in fact also differ from each other, in such a way as to adhere to objects having particular shapes and/or physical characteristics.

Suction passages 7i terminating in each of the said pick-up suction cups 3i are formed in the aforesaid secondary unit 6, and these suction passages 7i are connected to a single collecting passage 8 opening into a hole 9 formed on the upper face 6s of the said secondary unit 6, which is smooth and shaped in such a way that it can adhere to the previously described support cup 1 and vacuum transfer cup 2 of the main unit 5 when placed next to them.

The terminal portion 10 according to the invention operates as follows: when an object 12 is to be picked up by the combined action of the pick-up suction cups 3i of the secondary unit 6, the lifting element (not shown in the figures), carrying the main unit 5 at its free end, is moved, while the said equipment 4 is activated in such a way as to generate a vacuum (arrows E, F) within its support cup 1 and vacuum transfer cup 2, and the main unit 5 is brought to a position above the secondary unit 6. The said pick-up element is then used again to set the main unit 5 down on the upper face 6s of the secondary unit 6, which is supported by a support housing 11 (FIG. 1), making the said support cup 1 and vacuum transfer cup 2 adhere to this upper face. During the working operation, the vacuum transfer cup must be positioned frontally and coaxially with respect to the said hole 9 of the secondary unit 6.

Figure 2:
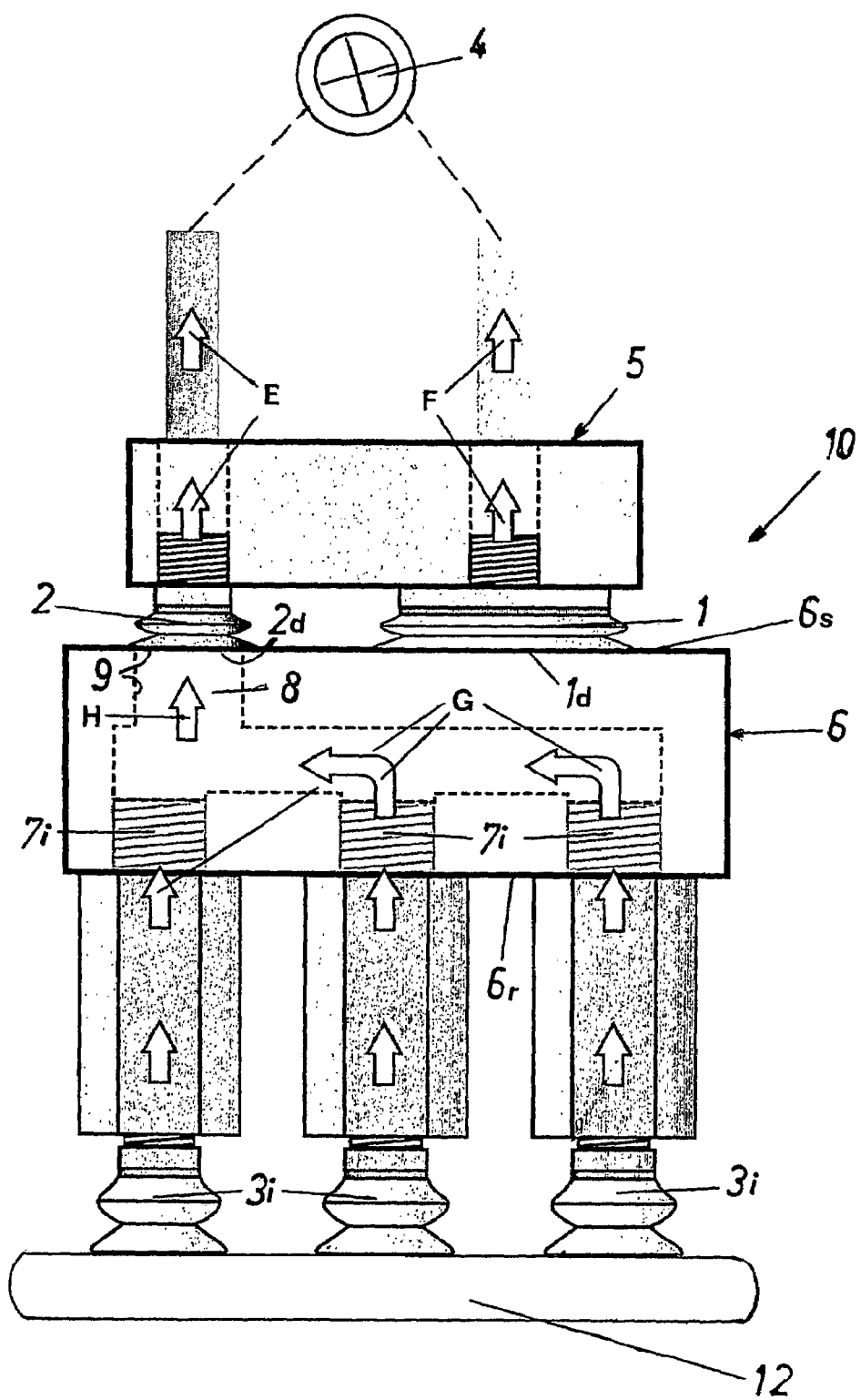
FIG. 2 is a view similar to that of FIG. 1, with the secondary unit connected to the main unit which supports it.

The main unit 5 and the secondary unit 6, which are interconnected pneumatically by the action of the support cup 1, thus form a single assembly, as shown in FIG. 2, and the vacuum E present in the vacuum transfer cup 2 is communicated through the said hole 9 (arrow H) to the collecting passage 8 to which are connected the suction passages 7i of all the pick-up suction cups 3i of the secondary unit 6, which are therefore all activated by a vacuum (arrows G) and are thus able to pick up an object 12 adhering to them. By suitably positioning the terminal portion 10, it is therefore possible, as mentioned above, to pick up an object 12 by means of the combined action of its suction cups 3i, the characteristics of which have been selected according to the physical characteristics of the object 12 to be picked up. This pick-up can therefore be carried out in the most reliable way, and the lifting element can then transfer the object, adhering to the terminal portion 1, to any position other than the initial position in which it has been picked up.

On completion of the operation of picking up and transferring an object 12, it is possible to continue by repeating the operation with other secondary units carrying suction cups of different types, after each secondary unit 6 has be returned to its support housing 11 (FIG. 1). Clearly, the versatility of the system will be considerably enhanced by the provision of a magazine (not shown in the drawings) housing a plurality of secondary units carrying sets of suction cups of different types.

Evidently, in order to make it possible to carry out the operations described above, the upper face 6s of the secondary unit 6 must be smooth, and its surface must be shaped in such a way that it can adhere perfectly to the bases 1d, 2d of the support cup 1 and the vacuum transfer cup 2.

The simplest and most economical way of achieving this result, shown more clearly in FIG. 1, is to make the said upper face 6s of the secondary unit 6 perfectly flat, and to form the support cup 1 and vacuum transfer cup 2 so that their respective bases 1d, 2d lie on a plane α parallel to the plane β on which the upper face 6s of the secondary unit 6 lies.

It is considered unnecessary to describe the part of the pneumatic system located upstream of the terminal portion 10 according to the invention and its components, such as solenoid valves and the like, since it can be constructed by a person skilled in the art without the need for any further explanation.

The invention claimed is:

1. A terminal portion (10) of a robotic pickup element intended to lift objects (12) and transfer them to positions other than the initial positions comprises:

a) a main unit (5), a main unit lower face (5r) on which are fixed a support suction cup (1) and a vacuum transfer suction cup (2) connected to a pneumatic equipment (4);

b) a secondary unit (6), a secondary unit lower face (6r) on which are mounted a plurality of pick-up suction cups (3i) which may be of different types, suction passages (7i) which are connected to a collecting passage (8) opening into a hole (9) formed a upper face (6s) of the said secondary unit (6); and the upper face (6s) of the secondary unit (6) being smooth and shaped in such a way as to be able to adhere to both said support suction cup (1) and the vacuum transfer suction cup (2) of the main unit (5) when they are placed next to it and the vacuum transfer suction cup (2) of the main unit (5) faces, and is coaxial with, the hole (9) of the secondary unit (6), in such a way that the main unit (5) and the secondary unit (6), are interconnected pneumatically by the action of the support suction cup (1), thus form a single assembly, wherein, the connection between said terminal portion (10) and said objects (12) being made by the suction cups (3i) in which a vacuum is created by the pneumatic equipment (4) through the hole (9) and the collecting passage (8) which are connected to the suction passages (7i).

2. The terminal portion according to claim 1, in which the upper face (6s) of said secondary unit (6) is flat, and said suction support cup (1) and the vacuum transfer suction cup (2) terminate in their lower parts in bases (1d, 2d) lying on a plane (α) parallel to the plane (β) of said upper face (6s) of the secondary unit (6).

\* \* \* \* \*